United States Patent
Yeo et al.

(10) Patent No.: US 9,828,481 B2
(45) Date of Patent: Nov. 28, 2017

(54) METHOD OF MANUFACTURING POROUS CERAMIC BODY AND COMPOSITION FOR POROUS CERAMIC BODY

(71) Applicant: Korea Institute of Energy Research, Daejeon (KR)

(72) Inventors: Jeong-Gu Yeo, Daejeon (KR); Jin-Seok Lee, Daejeon (KR); Young-Hwan Kim, Seoul (KR); Yeon-Gil Jung, Changwon-si (KR); Ungyu Paik, Seoul (KR)

(73) Assignee: Korea Institute of Energy Research, Daejeon (KR)

( * ) Notice: Subject to any disclaimer, the term of this patent is extended or adjusted under 35 U.S.C. 154(b) by 283 days.

(21) Appl. No.: 14/410,898

(22) PCT Filed: Jun. 28, 2013

(86) PCT No.: PCT/KR2013/005773
§ 371 (c)(1),
(2) Date: Dec. 23, 2014

(87) PCT Pub. No.: WO2014/003489
PCT Pub. Date: Jan. 3, 2014

(65) Prior Publication Data
US 2015/0137407 A1   May 21, 2015

(30) Foreign Application Priority Data

Jun. 29, 2012  (KR) .................. 10-2012-0070560
Jun. 27, 2013  (KR) .................. 10-2013-0074768

(51) Int. Cl.
C08J 9/00    (2006.01)
C08J 9/26    (2006.01)
(Continued)

(52) U.S. Cl.
CPC ............. *C08J 9/0095* (2013.01); *C04B 35/48* (2013.01); *C04B 35/62665* (2013.01);
(Continued)

(58) Field of Classification Search
CPC .... C04B 35/14; C04B 35/48; C04B 35/65665
(Continued)

(56) References Cited

U.S. PATENT DOCUMENTS 4,557,773 A * 12/1985 Bonzo .................... B01D 25/22
                                                          156/253
5,433,904 A *  7/1995 Noky ................. B01D 39/2075
                                                          264/40.1
(Continued)

FOREIGN PATENT DOCUMENTS

JP     2005-79156 A     7/2005
JP     2010-052408 A    3/2010
(Continued)

OTHER PUBLICATIONS

Rahaman, M. N. Ceramic Processing and Sintering. New York: M. Dekker, 1995, pp. 264-272.*
(Continued)

*Primary Examiner* — Nahida Sultana
(74) *Attorney, Agent, or Firm* — Westman, Champlin & Koehler, P.A.; Amanda M. Prose

(57) ABSTRACT

Disclosed is a method of manufacturing a porous ceramic body, which includes: (S1) mixing silica powders having a particle size of 0.045~0.5 mm, zircon flour and wax, thus preparing a ceramic mixture; (S2) placing the ceramic mixture into a mold, thus producing a green body; and (S3) sintering the green body at high temperature, thus obtaining a porous ceramic body, wherein the silica having a particle size of 0.1~0.5 mm is contained in an amount of 50~80 wt % based on the total weight of the porous ceramic body; and
(Continued)

also which produces a bulk porous ceramic body having good strength and leaching properties with excellent dimensional stability and shape stability.

10 Claims, 8 Drawing Sheets

(51) Int. Cl.
　　*C04B 38/06*　　(2006.01)
　　*C04B 35/48*　　(2006.01)
　　*C04B 35/626*　　(2006.01)
　　*C04B 35/632*　　(2006.01)
　　*C04B 35/634*　　(2006.01)

(52) U.S. Cl.
　　CPC .......... *C04B 35/632* (2013.01); *C04B 35/634* (2013.01); *C04B 38/061* (2013.01); *C08J 9/26* (2013.01); *C04B 2235/3217* (2013.01); *C04B 2235/3248* (2013.01); *C04B 2235/3418* (2013.01); *C04B 2235/3826* (2013.01); *C04B 2235/5427* (2013.01); *C04B 2235/5436* (2013.01); *C04B 2235/5472* (2013.01); *C04B 2235/656* (2013.01); *C04B 2235/6567* (2013.01); *C08J 2391/06* (2013.01)

(58) Field of Classification Search
　　USPC .......................... 264/603, 628, 653, 669, 670
　　See application file for complete search history.

(56) References Cited

U.S. PATENT DOCUMENTS

| | | | | |
|---|---|---|---|---|
| 7,723,250 | B2 | 5/2010 | Hayashi et al. | |
| 7,977,274 | B2* | 7/2011 | Gueckel | B01J 23/688 502/241 |
| 8,513,154 | B2* | 8/2013 | Allen | B01J 21/04 502/232 |
| 8,513,156 | B2* | 8/2013 | Serafin | B01J 21/066 502/242 |
| 9,101,906 | B2* | 8/2015 | Bryden | B01J 21/04 |
| 9,101,918 | B2* | 8/2015 | Gueckel | B01J 23/688 |
| 2004/0148916 | A1* | 8/2004 | Merkel | B01D 46/2429 55/523 |
| 2005/0021127 | A1* | 1/2005 | Kawula | A61F 2/82 623/1.15 |
| 2005/0069469 | A1* | 3/2005 | Fu | B01D 46/2429 422/177 |
| 2007/0092411 | A1* | 4/2007 | Leach | B01L 3/50273 422/400 |
| 2007/0111886 | A1* | 5/2007 | Serafin | B01J 21/066 502/348 |
| 2010/0056816 | A1* | 3/2010 | Wallin | B01D 67/0041 549/534 |
| 2010/0113249 | A1* | 5/2010 | Beauseigneur | C04B 35/185 501/80 |
| 2011/0293917 | A1* | 12/2011 | Bookbinder | B01D 67/0046 428/316.6 |
| 2012/0097602 | A1* | 4/2012 | Tedford | B65D 65/466 210/500.1 |
| 2014/0339745 | A1* | 11/2014 | Uram | B29C 39/36 264/681 |

FOREIGN PATENT DOCUMENTS

| | | |
|---|---|---|
| JP | 2011-230981 A | 11/2011 |
| KR | 10-1996-0004386 B1 | 4/1996 |
| KR | 10-2004-0086621 A | 10/2004 |

OTHER PUBLICATIONS

International Search Report and Written Opinion dated Oct. 1, 2013 for corresponding International Patent Application No. PCT/KR2013/005773, filed Jun. 28, 2013.

* cited by examiner

METHOD OF MANUFACTURING POROUS CERAMIC BODY AND COMPOSITION FOR POROUS CERAMIC BODY

CROSS-REFERENCE TO RELATED APPLICATIONS

This Application is a Section 371 National Stage Application of International Application No. PCT/KR2013/005773, filed Jun. 28, 2013, published as WO 2014/003489 A1 on Jan. 3, 2014, in Korean, which is based on and claims the benefit of Korean Patent Application No. 10-2012-0070560, filed Jun. 29, 2012; and Korean Patent Application No. 10-2013-0074768, filed Jun. 27, 2013; the contents of which are hereby incorporated by reference in their entireties.

BACKGROUND OF THE INVENTION

1. Field of the Invention

The present invention relates to a method of manufacturing a porous ceramic body and a composition for a porous ceramic body, and more particularly, to a method of manufacturing a porous ceramic body and a composition for a porous ceramic body, wherein a coarse particles that is difficult to manufacture in bulk form using pressing, plastic forming or casting as a ceramic forming process is used together with wax, thereby producing a porous ceramic body having good mechanical and leaching properties while retaining excellent dimensional stability and shape stability.

2. Description of the Related Art

A porous ceramic body is used as a material for a filter for separation and recovery of gas, liquid and solid or a filtering support, and a core or a shell mold for forming a specific shape or a channel for metal investment casting.

Typically, a ceramic product is known to undergo a conventional forming process including pressing such as uniaxial or isostatic pressing using metal dies, plastic deformation forming such as extrusion or injection using plasticity, and casting such as slip, tape or gel casting using slurry fluidity. A conventional method of forming a ceramic product employs processing additives that facilitates the formability and working of dispersed fine particles. the example of processing additive are an organic or inorganic binder, a plasticizer, a dispersant, a defoaming agent, water and or an organic solvent. When water or an organic solvent is used as the forming aid in such a way, an additional removal process thereof has to be carried out. In the presence of such an additive system, the ceramic product may easily shrink or distort from the desired shape during heat treatment. Furthermore, the impurities remaining after removal of the solvent deteriorate mechanical properties of the ceramic product. Hence, taking into consideration the eco-friendly and technological benefits of a ceramic manufacturing process, a novel forming method is required, which does not need an additive such as solvent or an organic or inorganic binder.

Powder processing for ceramics generally includes preparing a powder, mixing various powders (or making a slurry), forming a green body in a desired shape and carrying out subsequent heat treatment (drying and sintering) to obtain a dense product for each purpose. As such, the particle size has a direct influence on formability or density of a green and a sintered body. Nano-sized powders that is too small is not easily pressed due to the high surface area relative to the volume, and large powders having a size ranging from ones of mm to hundreds of μm has poor formability due to a remarkably decreased surface area effect. In particular, a fused silica having a size of hundreds of μm is similar to sand and is difficult to be compacted even under high pressure, but a small amount of water or adhesive liquid added into large powders may play a role as a binder to form a predetermined shape. Moreover, a ceramic powder, which is difficult to be compacted alone, may be prepared in the dispersed phase in the dispersing medium (slurry) with the use of an additive such as proper solvent and a dispersant. However, since a ceramic powder having a size of hundreds of μm is larger than a colloid, it is affected by gravity rather than interparticle forces and thus may rapidly settle down, making it difficult to perform colloid processing.

As for powder processing as above, inhomogeneity of the ceramic compacts may be caused from the powder itself and powder (or slurry) preparation, or compaction and densification step. Furthermore, the forming aids including organic additives are primary heterogeneous components in powders. Each heterogeneous component is stress concentrator, which in early stage it makes cracking leading to mechanical failure.

CITATION LIST

Patent Literature: Korean Patent No. 10-0530093

SUMMARY OF THE INVENTION

Accordingly, the present invention has been made keeping in mind the above problems encountered in the related art, and an objective of the present invention is to provide a method of manufacturing a porous ceramic body having good strength and leaching properties with excellent dimensional and shape stability by subjecting a mixture of silica powders, zircon flour and wax to forming and high-temperature sintering.

In order to accomplish the above objective, the present invention provides a method of manufacturing a porous ceramic body by mixing at least a predetermined amount of fused silica ($SiO_2$) powders having a particle size of 0.045~0.5 mm with zircon flour ($ZrSiO_4$) and wax and then carrying out forming and subsequent sintering.

More specifically, a method of manufacturing a porous ceramic body according to the present invention comprises: (S1) mixing silica powders having a particle size of 0.045~0.5 mm, zircon flour and wax, thus preparing a ceramic mixture; (S2) placing the ceramic mixture into a mold, thus producing a green body; and (S3) sintering the green body at high temperature, thus obtaining a porous ceramic body, wherein the silica powders having a particle size of 0.1~0.5 mm is contained in an amount of 50~80 wt % based on the total weight of the porous ceramic body.

In S1 of the method according to the present invention, the silica powders having a particle size of 0.045~0.5 mm may comprise: silica powders having a particle size of 0.2~0.5 mm; silica powders having a particle size of 0.1~0.2 mm; silica powders having a particle size of 0.149 mm; and silica powders having a particle size of 0.045 mm, and the zircon flour may have a particle size of 0.045 mm.

In S1 of the method according to the present invention, the wax may be contained in an amount of 5~40 wt % based on the total weight of the ceramic mixture.

In S1 of the method according to the present invention, the ceramic mixture may comprise, based on the total weight thereof, 1~15 wt % of silica powders having a particle size of 0.2~0.5 mm; 1~40 wt % of silica powders having a particle size of 0.1~0.2 mm; 5~40 wt % of silica powders having a particle size of 0.149 mm; 5~50 wt % of silica powders having a particle size of 0.045 mm; 10~50 wt % of zircon flour having a particle size of 0.045 mm; and 5~40 wt % of wax.

In S1 of the method according to the present invention, the ceramic mixture may further comprise an additive selected from the group consisting of alumina, silicon carbide, polyvinylalcohol, cellulose, polyvinylbutyral, acrylate and ethyl silicate.

In S1 of the method according to the present invention, the wax may be selected from the group consisting of paraffin wax, microcrystalline wax, polyolefin wax, beeswax, carnauba wax and mixtures thereof. When the wax according to the present invention is a wax mixture, two kinds of wax having different melting points are preferably mixed at a weight ratio of 6:4~9:1. In the present invention, it is preferred that the wax mixture comprises paraffin wax having a melting point of 70° C. and microcrystalline wax having a melting point of 82° C. mixed at a weight ratio of 8:2.

S1 of the method according to the present invention may further comprise maintaining the ceramic mixture at a temperature of 50~85° C., after preparing the ceramic mixture.

In S3 of the method according to the present invention, the green body obtained in S2 may be sintered at a temperature of 1000~1400° C., and the holding time of the temperature for sintering the green body may be 2~24 hr.

Advantageous Effects of the Invention

According to the present invention, a method of manufacturing a porous ceramic body enables the production of a bulk porous ceramic body having good strength and leaching properties with excellent dimensional stability and shape stability by using silica powders having a particle size of 0.045~0.5 mm, zircon flour and wax.

Also, the method of the invention does not require a foaming agent that results in an irregular pore size and makes controlling porosity difficult or a solvent that imparts poor mechanical properties.

According to the present invention, a porous ceramic body can be used as a material for a filter for separation and recovery of gas, liquid and solid or a support having a filtration function, and a core or a shell mold for forming a specific shape or a channel for metal casting.

DETAILED DESCRIPTION OF THE EMBODIMENTS

Figure 1:
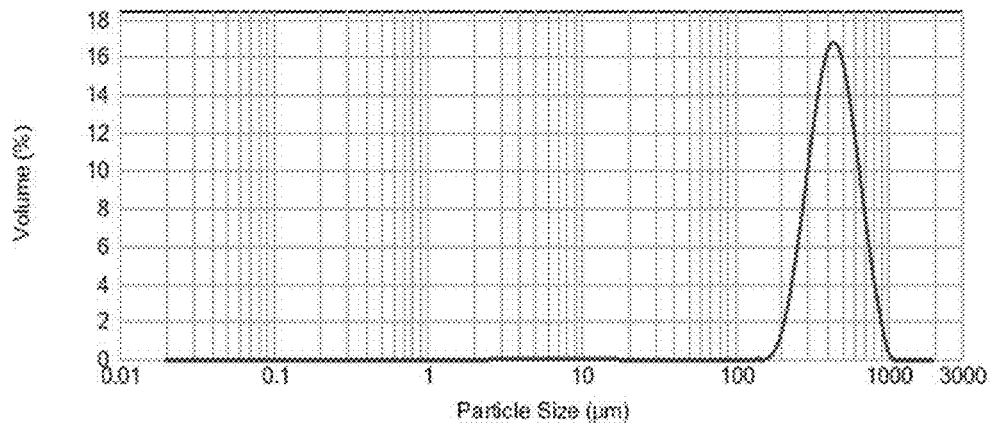
FIG. 1 illustrates a particle size distribution curve of silica powders having a nominal particle size of 0.2~0.5 mm.
Figure 2:
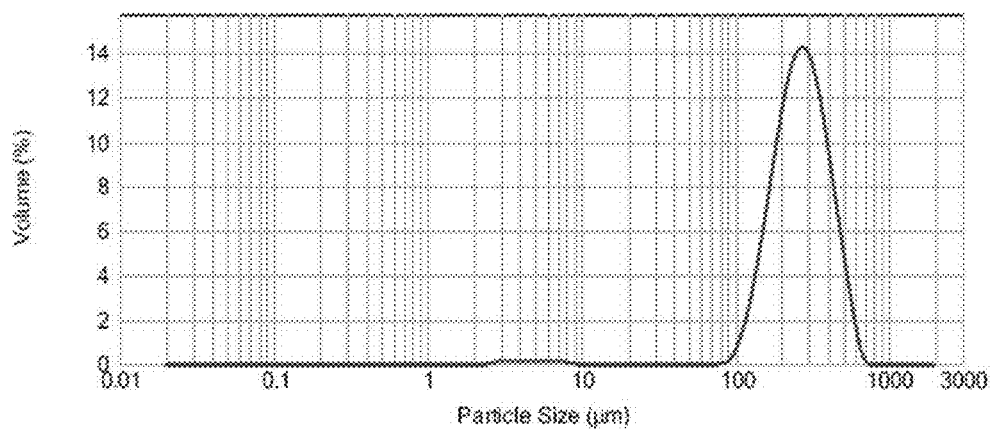
FIG. 2 illustrates a particle size distribution curve of silica powders having a nominal particle size of 0.1~0.2 mm.
Figure 3:
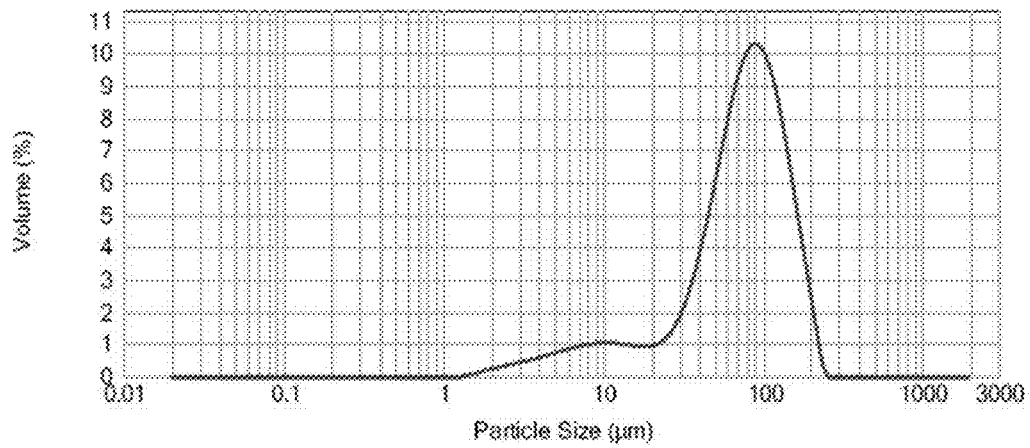
FIG. 3 illustrates a particle size distribution curve of silica powders having a nominal particle size of 0.149 mm.
Figure 4:
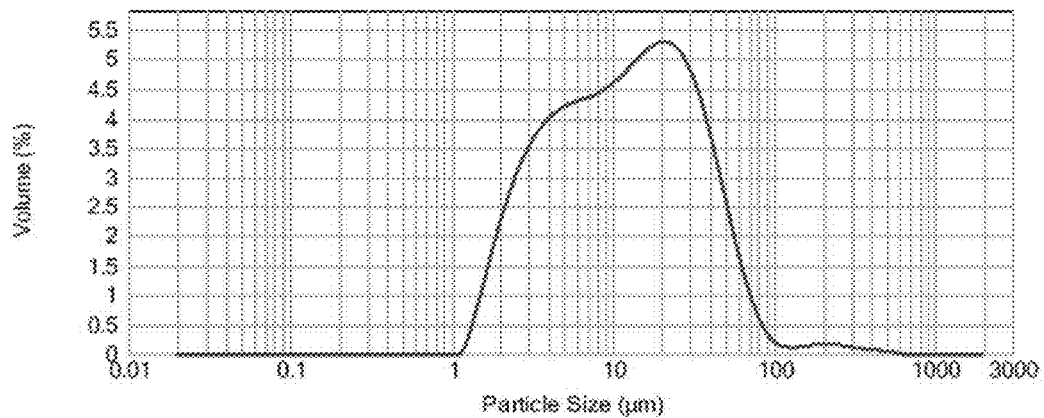
FIG. 4 illustrates a particle size distribution curve of silica powders having a nominal particle size of 0.045 mm.

The present invention addresses a method of manufacturing a porous ceramic body having high strength and superior leaching properties with excellent dimensional stability and shape stability. In particular, the present invention is characterized in that a ceramic mixture including wax is molded and sintered at high temperature.

According to the present invention, a method of manufacturing a porous ceramic body may comprise: (S1) mixing silica powders having a nominal particle size of 0.045~0.5 mm, zircon flour and wax, thus preparing a ceramic mixture; (S2) placing the ceramic mixture into a mold, thus producing a green body; and (S3) sintering the green body at high temperature, thus obtaining a porous ceramic body, wherein the silica powder having a nominal particle size of 0.1~0.5 mm is contained in an amount of 50~80 wt % based on the total mass of the porous ceramic body.

In step S1, silica powders having a median particle size of 0.045~0.5 mm, zircon flour, and wax are mixed, thus preparing a ceramic mixture.

In the ceramic mixture according to the present invention, silica and zircon works to prevent reaction with a cast metal and to improve thermal shock and thermal expansion behaviors at high temperature. Useful in the present invention, silica is non-crystalline, that is, amorphous fused silica. The fused silica has a very low coefficient of thermal expansion and thus cracking does not occur due to a drastic temperature change in contact with a metal melt at high temperature, thus exhibiting superior thermal shock resistance. The coefficient of thermal expansion of the fused silica is 0.5 ppm/k in the temperature range of 0° C. to at least 1000° C. Useful is silica powders having a particle size of 0.045~0.5 mm, and especially silica powders having a particle size of 0.1~0.5 mm has to be contained in an amount of 50~80 wt % based on the total mass of the porous ceramic body that is a final product according to the present invention. As such, the total mass of the porous ceramic body indicates the sum of the weight of silica and zircon flour remaining after complete removal of the wax component in the course of high-temperature sintering of the ceramic mixture.

If the amount of silica powder having a particle size of 0.1~0.5 mm is less than 50 wt % or exceeds 80 wt %, formability may become undesirably poor, making it impossible to produce a porous ceramic body.

As the silica powder having a particle size of 0.1~0.5 mm, so-called 'coarse particles', is contained in an amount of 50~80 wt % based on the total weight of the porous ceramic body that is a final product, the porous ceramic body may be easily removed when used as a core or a shell mold, thus exhibiting superior leaching properties. Since coarse particles having a nominal particle size of 0.1 mm or more are dominated by gravity rather than interparticle attraction, they may be removed while easily precipitating even by weak external force because of high mobility thereof. On the other hand, particles having a colloid size corresponding to about ones of μm may be agglomerated or agglomerated by interparticle attraction rather than gravity, and thus is not easily broken unless specific treatment is performed. Even when the coarse powders undergoes subsequent high-temperature heat treatment, it has a small number of contact points between particles and may not exhibit a high surface area effect relative to volume, compared to the colloid-sized powder. Hence, such a coarse powder seldom shrinks due to high-temperature heat treatment, ultimately making it possible to maintain the shape and size of a green body even after high-temperature heat treatment.

The particle size of the zircon flour, which is contained in the ceramic mixture according to the present invention, is not particularly limited but preferably has a nominal particle size ranging from sub-μm to tens of μm same as or similar to the silica in respect of formability and sinterability. For formability, a particle size corresponding to ones of μm is very preferable. If the particle size falls outside of the above range, the use of a specific equipment or forming aids are required. The powders having a size of hundreds of μm are not densed due to a relative reduction in surface energy during sintering process, and it is difficult to maintain the shape thereof after the sintering process. If fine particles having a nano size less than sub-μm are used, the cost of manufacturing is rising sharply due to a drastic increase in the material cost, and also it is difficult to ensure formability and sinterability due to nano effects based on an enlargement in the surface area unless specific treatment is carried out. When zircon flour is used in the present invention, there is no reactivity with metals to thus prevent corrosion. Additionally, surface finishing and wear resistance may become superior, thereby producing a metal product having a smooth surface. Therefore, zircon flour having an appropriate size may be selectively used.

The wax, which is contained in the ceramic mixture according to the present invention, may function to improve dimensional stability and shape stability of the finally produced porous ceramic body. Preferably, the wax of the invention is selected from the group consisting of paraffin wax, microcrystalline wax, polyolefin wax, beeswax, carnauba wax and mixtures thereof, but is not limited thereto.

Particularly useful is a mixture comprising two kinds of wax having different melting points at a weight ratio of 6:4~9:1. When two kinds of wax having different melting points are used, wax mixture will be removed at a broad range of temperature with heating. Coarse powders and fine powders may be densely filled during the above time period of process while particle movement occurs with the aid of melting wax. For example, paraffin wax having a melting point of 70° C. and microcrystalline wax having a melting point of 82° C. may be used at a weight ratio of 8:2.

FIGS. 1 to 4 illustrate particle size distribution analysis results of silica having nominal particle sizes of 0.2~0.5 mm, 0.1~0.2 mm, 0.149 mm and 0.045 mm. In an embodiment of the present invention, the silica having a particle size of 0.045~0.5 mm may include a silica having a particle size of 0.2~0.5 mm; silica powders having a particle size of 0.1~0.2 mm; silica powders having a particle size of 0.149 mm; and silica powders having a particle size of 0.045 mm, but the present invention is not limited thereto. Silica powders having a particle size distribution equivalent to the present invention may be selected by persons having ordinary knowledge in the art to which the present invention belongs ("those skilled in the art"). When coarse and fine particles in the particle size range of 0.045~0.5 mm are mixed, fine particles are located among coarse particles, thus providing superior formability and dimensional stability compared to when using the coarse particle or the fine particle alone.

Figure 5:
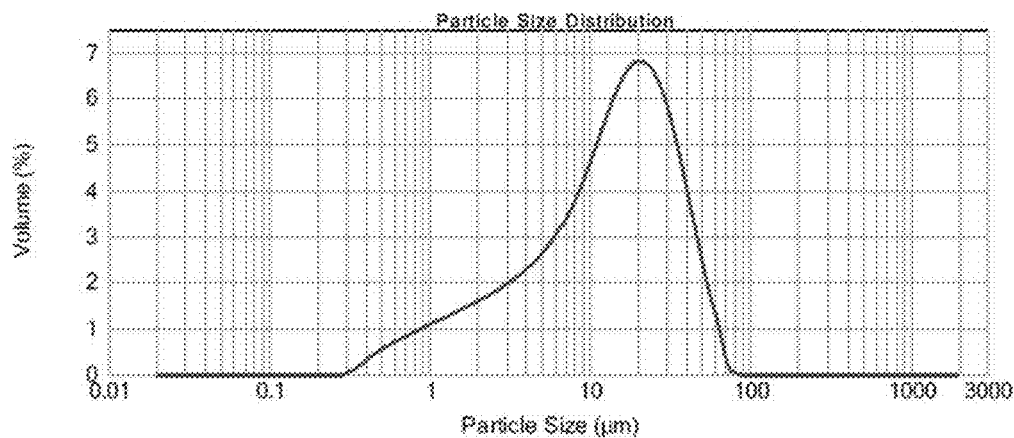
FIG. 5 illustrates a particle size distribution curve of zircon flour having a nominal particle size of 0.045 mm.

FIG. 5 illustrates a particle size distribution analysis curve of zircon flour having a nominal particle size of 0.045 mm. In an embodiment of the present invention, zircon flour having a nominal particle size of 0.045 mm may be used in step S1. Although the particle size thereof is not particularly limited, zircon flour having a nominal particle size of sub-μm to tens of μm as in the silica is preferred in order to acquire formability and sinterability.

According to the present invention, the ceramic mixture may comprise, based on the total mass thereof, 1~15 wt % of a silica having a particle size of 0.2~0.5 mm; 1~40 wt % of a silica having a particle size of 0.1~0.2 mm; 5~40 wt % of a silica having a particle size of 0.149 mm; 5~50 wt % of a silica having a particle size of 0.045 mm; 10~50 wt % of zircon flour having a particle size of 0.045 mm; and 5~40 wt % of wax.

In the present invention, strength testing was performed with a 3-point bending fixture on a universal testing machine (UTM). Thereby, strength, namely flexural strength may be measured. All measurement values are represented as the average value±standard error by measuring and averaging the strength values of three or more samples.

Figure 6:
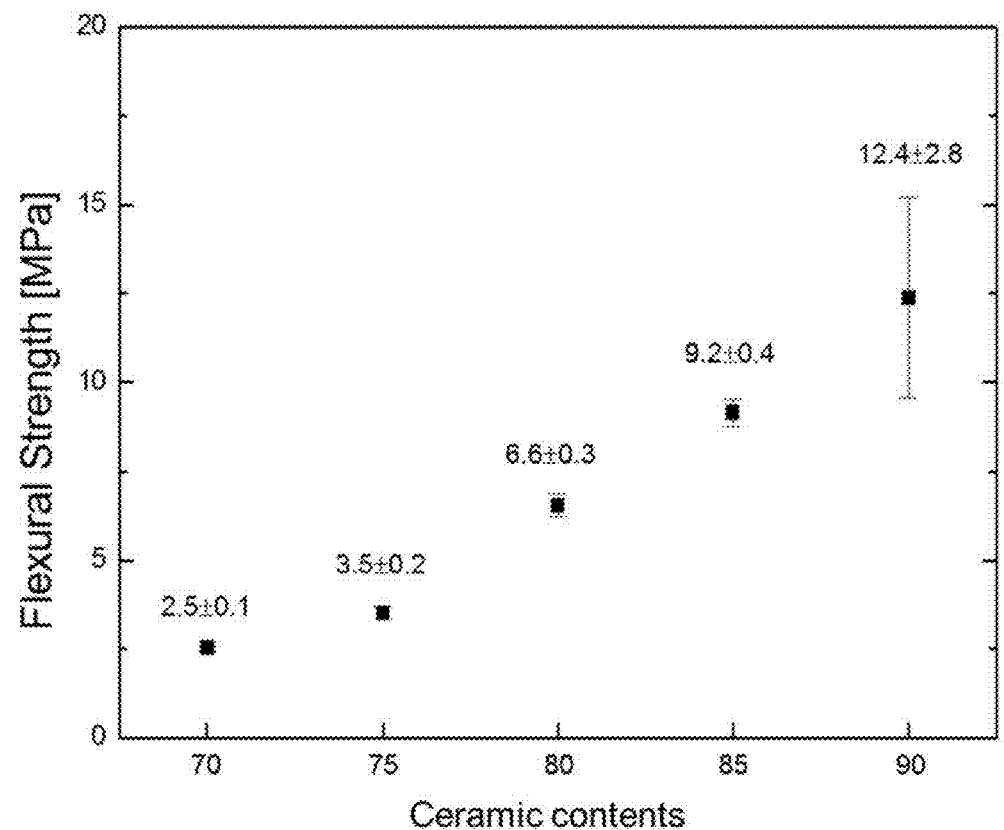
FIG. 6 illustrates the results of strength testing of a porous ceramic body as a variation of ceramic contents in mass % in a ceramic mixture.

FIG. 6 illustrates the results of strength testing versus the ceramic loading in the ceramic mixture, wherein the ceramics indicates the sum of silica and zircon flour. As illustrated in FIG. 6, if the weight of wax exceeds 40 wt % (corresponding to 60% ceramic), the ceramic mixture has not enough strength to measure and thus is not suitable for use in the porous ceramic body. In contrast, if the weight of wax is less than 5 wt % (corresponding to 95% ceramic), a sufficient amount of liquid (that is, melted wax), as much as the ceramics can be mixed, may not be formed. When individual components are given in the above weight ranges, well-forming and dimensional stability is obtained. If the amounts thereof fall outside of the above weight ranges, the prepared feedstock may not be flowable for forming or sintered body is too weak to handle, and thus bulk products cannot be obtained. The amount ranges equivalent to the present invention may be selected by the person of ordinary skill in the art.

Figure 7:
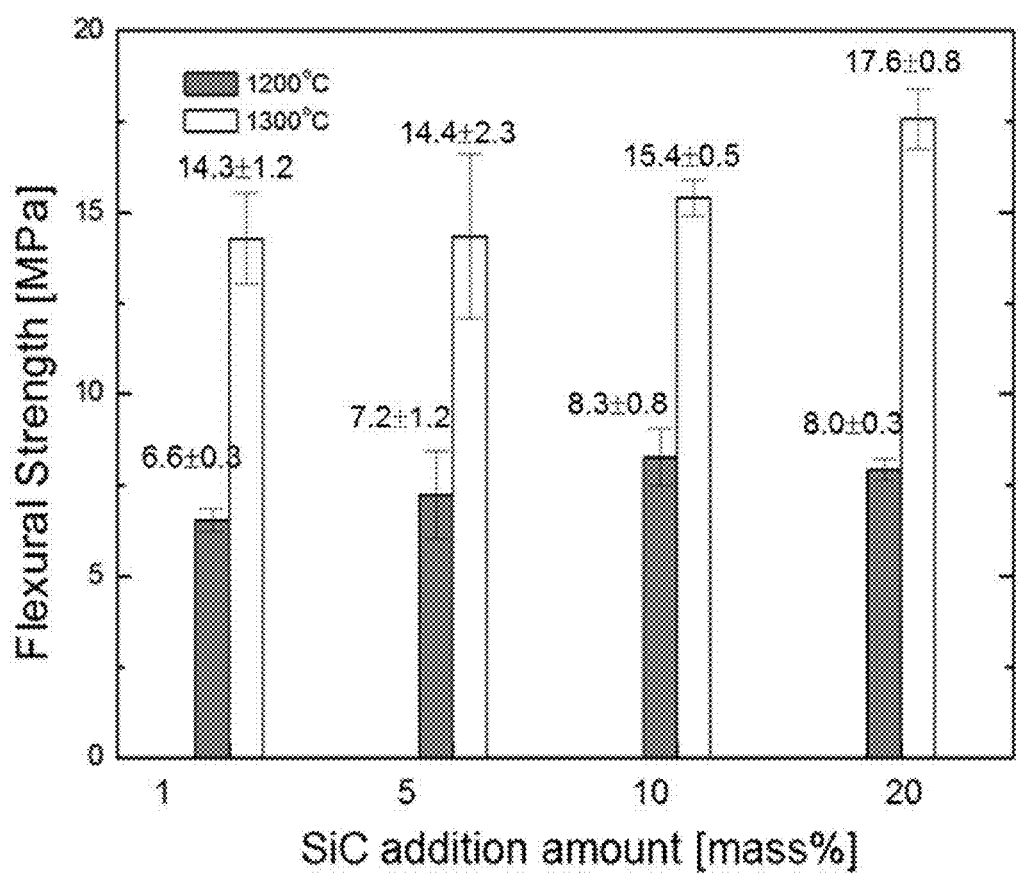
FIG. 7 illustrates the results of strength testing of a porous ceramic body as a variation of the amount of added silicon carbide.

In an aspect of the present invention, the ceramic mixture may further include additives in step S1. The use of the additive enhances forming and sinterability, and give change to thermal properties of the porous ceramic body. Examples of the additive may include, but are not limited to, alumina, silicon carbide, polyvinylalcohol, cellulose, polyvinylbutyral, acrylate, and ethyl silicate. Preferably useful is silicon carbide or alumina. FIG. 7 illustrates the results of strength testing as a variation of the addition amount of silicon carbide of 1~20 wt % to the ceramic containing alumina is added at a fixed amount of 1 wt %. Strength is increased with an increase in silicon carbide from 1 wt % to 20 wt %.

In an aspect of the present invention, step S1 may further include maintaining the ceramic mixture at 50~85° C. after preparing the ceramic mixture. When the ceramic mixture is maintained at the above temperature, the ceramic mixture may become totally uniform while the dissolved wax is present among the ceramic particles.

In step S2, the mixture prepared in S1 is placed into a mold, thus producing a green body, preferably a green body with a particular shape. According to the present invention, as the mixture is simply placed into a mold without the need for pressing that is essential in conventional techniques, a green body having a predetermined shape is produced. The mold or die may be employed by appropriately for the purpose selecting the shape, size and material so as to be adapted for products to be manufactured in such a way that it can be performed by the person skilled in the art, but is not particularly limited.

Figure 8:
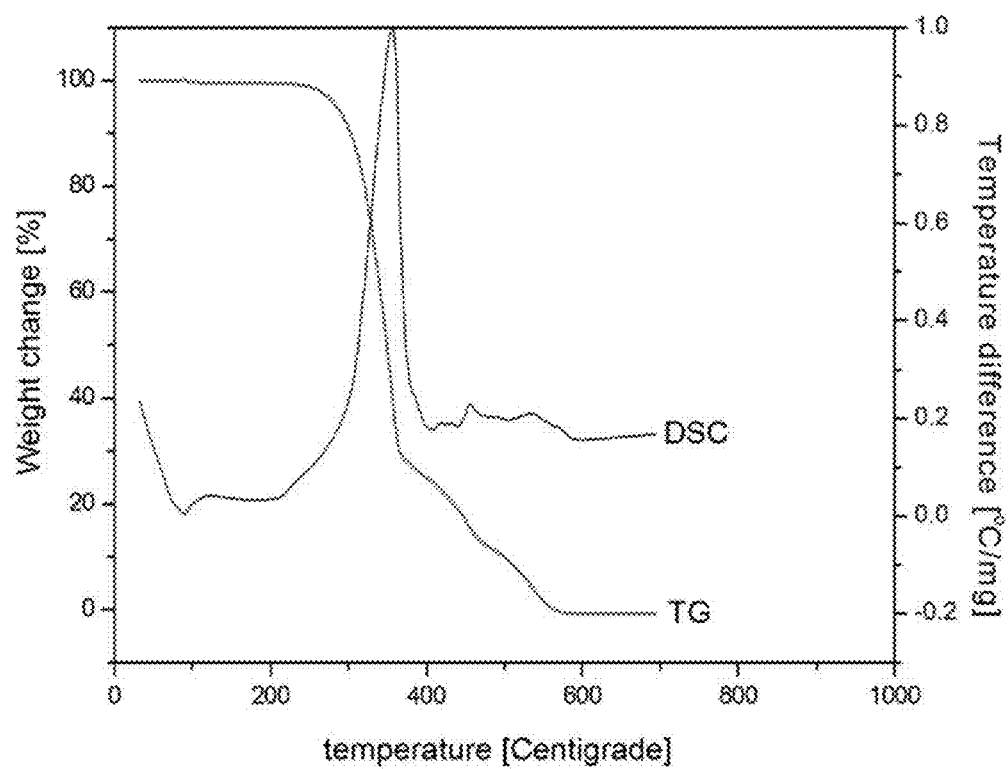
FIG. 8 illustrates thermogravimetry (TG)-differential scanning calorimetry (DSC) curves of wax with temperature.

In step S3, the green body obtained in S2 is sintered at high temperature, thereby manufacturing a porous ceramic body. In step S3, the green body is densed through high-temperature sintering, resulting in a bulk porous ceramic body. The porous ceramic body according to the present invention includes the silica having a particle size of 0.045~0.5 mm. In particular, since the silica having a particle size of 0.1~0.5 mm is included at an amount of 50~80 wt % based on the total weight of the porous ceramic body, there is no change in dimension between the green body before heat treatment and the sintered body after heat treatment. During high-temperature sintering, the wax is completely removed from the ceramic mixture, and the volume occupied by the wax is left behind as voids, thus completing the porous ceramic body. The method of manufacturing the porous ceramic body according to the present invention may not require solvent nor a foaming agent that may result in an irregular pore size and porosity leading to poor mechanical properties. FIG. 8 illustrates TG-DSC curves of the wax with elevating temperature, wherein the wax mixed with ceramics is reduced by 1~2 wt % at 260° C. based on the weight used to prepare the ceramic mixture and is then removed by 70 wt % at 370° C. and completely removed at 600° C. or higher.

Figure 9:
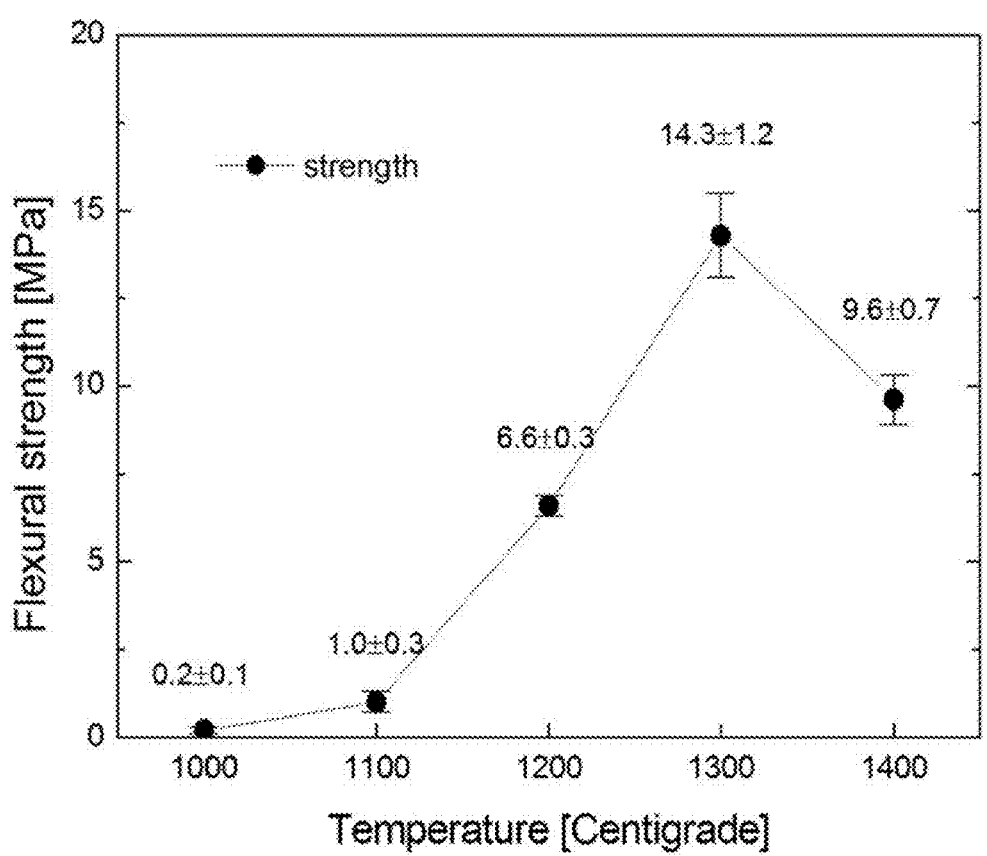
FIG. 9 illustrates the results of strength testing of a porous ceramic body with sintering temperature.

In step S3, the green body is preferably sintered at 1000~1400° C. As the green body is heated in the above temperature range, a variety of particles is closely packed and rearranged. Finally, the sample may become dense while the interparticle connection (necking) is enhanced with sintering. FIG. 9 illustrates changes in strength versus sintering temperature, wherein the strength of the porous ceramic body increases with temperature from 1000° C. to 1400° C. The porous ceramic body sintered at a temperature less than 1000° C. may have low strength and shall be easily broken to pieces even by weak external force. On the other hand, the porous ceramic body sintered at a temperature higher than 1400° C. may have superior strength, but the material properties, e.g., leaching property, other than the strength may deteriorate.

Figure 10:
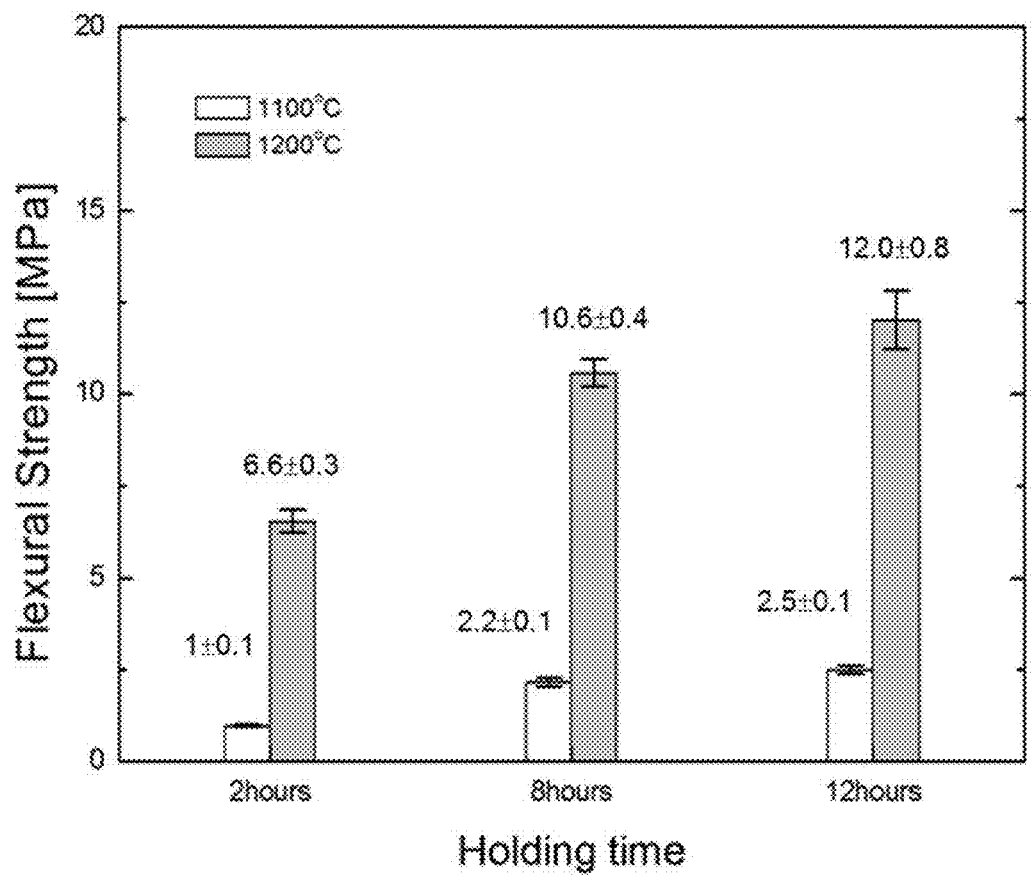
FIG. 10 illustrates the results of strength testing of a porous ceramic body with holding time of sintering.

Also, the sintering time may be determined in the range of 2~24 hr, but may be appropriately selected by the person of ordinary skill in the art. Taking into consideration the economic benefits including the process cost, the process time is preferably to 2~24 hr, more preferably to 2~12 hr. FIG. 10 illustrates the results of strength testing of the porous ceramic body with various holding time. As the holding time increases from 2 hr to 8 hr or 12 hr at a sintering temperature of 1200° C., the strength of the sample is enhanced to 6.6±0.3 MPa, 10.6±0.4 MPa, and 12.0±0.8 MPa.

Below is a description of preferred embodiments of the present invention for illustrative purposes. However, the person of ordinary skill in the art would appreciate that various modifications, additions and substitutions are possible, without departing from the scope and spirit of the invention as disclosed in the accompanying claims.

EXAMPLE 1

Various kinds of silica and zircon were mixed, thus preparing a ceramic mixture that was then added with wax. The resulting mixture was placed into a mold with a predetermined size, thus producing a green body. Specifically, 70 g of a ceramic powder comprising, based on the weight thereof, a total of four kinds of silica, namely, 7 g of a fused silica having a nominal particle size of 0.2~0.5 mm (sold by Boram Chemical, Borasil-F, 25 Kg paper bag, $SiO_2$ 99.5%, 10 wt %), 21 g of a fused silica having a nominal particle size of 0.1~0.2 mm (sold by Boram Chemical, Borasil-F, 25 Kg paper bag, $SiO_2$ 99.5%, 30 wt %), 21 g of a fused silica having a nominal particle size of 0.149 mm (sold by Boram Chemical, Borasil-F, 25 Kg paper bag, $SiO_2$ 99.5%, 30 wt %), and 7 g of a fused silica having a nominal particle size of 0.045 mm (sold by Boram Chemical, Borasil-F, 25 Kg paper bag, $SiO_2$ 99.5%, 10 wt %), and 14 g of zircon flour having a nominal particle size of 0.045 mm (made by Richards Bay Minerals, sold by Samwoo Metal, ZR—S, $ZrO_2$ 66.6%, $SiO_2$ 32.4%, 20 wt %), was mixed with 30 g of petroleum wax and then maintained at 50° C. As such, the petroleum wax was wax mixture of paraffin wax with a melting point of 70° C. and microcrystalline wax with a melting point of 82° C. at a weight ratio of 8:2. Subsequently, the resultant mixture was placed into a plastic cylindrical vessel to produce a green body. Finally, heat treatment was performed at a high temperature of 1000° C. for 2 hr, giving a bulk porous ceramic body.

EXAMPLE 2

A bulk porous ceramic body was manufactured in the same manner as in Example 1, with the exception that heat treatment was performed at 1100° C. for 2 hr.

EXAMPLE 3

A bulk porous ceramic body was manufactured in the same manner as in Example 1, with the exception that heat treatment was performed at 1200° C. for 2 hr.

EXAMPLE 4

A bulk porous ceramic body was manufactured in the same manner as in Example 1, with the exception that heat treatment was performed at 1300° C. for 2 hr.

EXAMPLE 5

A bulk porous ceramic body was manufactured in the same manner as in Example 1, with the exception that heat treatment was performed at 1400° C. for 2 hr.

COMPARATIVE EXAMPLE 1

70 g of a ceramic mixture was prepared by mixing a total of four kinds of silica, namely, 7 g of a fused silica having a nominal particle size of 0.2~0.5 mm (sold by Boram Chemical, Borasil-F, 25 Kg paper bag, $SiO_2$ 99.5%, 10 wt %), 21 g of a fused silica having a nominal particle size of 0.1~0.2 mm (sold by Boram Chemical, Borasil-F, 25 Kg paper bag, $SiO_2$ 99.5%, 30 wt %), 21 g of a fused silica having a nominal particle size of 0.149 mm (sold by Boram Chemical, Borasil-F, 25 Kg paper bag, $SiO_2$ 99.5%, 30 wt %), 7 g of a fused silica having a nominal particle size of 0.045 mm (sold by Boram Chemical, Borasil-F, 25 Kg paper bag, $SiO_2$ 99.5%, 10 wt %) and 14 g of zircon flour having a nominal particle size of 0.045 mm (made by Richards Bay Minerals, sold by Samwoo Metal, ZR—S, 20 wt %). The ceramic mixture was uniaxially pressed at a pressure of 1.5 ton using a 12-ton bench top press (Carver, Inc., USA), thus forming a molded body, which was then thermally treated at 1100° C. for 2 hr, ultimately obtaining a porous ceramic body.

COMPARATIVE EXAMPLE 2

A porous ceramic body was manufactured in the same manner as in Comparative Example 1, with the exception that a green body was produced at a pressure of 2 ton using a press, and heat treatment was performed at 1300° C. for 2 hr.

TEST EXAMPLE 1: Measurement of Weight Reduction

The leaching properties of the porous ceramic body samples of Examples 1 to 5 in a 40 wt % NaOH aqueous solution were evaluated using a pressure reactor. The pressure of the reactor vessel could be adjusted by the value of temperature. Based on the measurement results, 100° C. corresponds to about 1~2 bar, 160° C. corresponds to about 2~4 bar, and 200° C. corresponds to 6~8 bar. The sample was immersed in a 40 wt % NaOH solution in the reactor and then maintained at 160° C. for 1 hr. The sample was washed several times with clean water and dried at 150° C. Sample mass before and after leaching was measured using an analytical-grade precision balance. The results of weight reduction are shown in Table 1 below. The weight reduction, expressed as a percentage, is determined by dividing a weight change before and after leaching by the initial sample weight before leaching.

TABLE 1

|  | Ex. 1 | Ex. 2 | Ex. 3 | Ex. 4 | Ex. 5 |
| --- | --- | --- | --- | --- | --- |
| Sintering temperature | 1000° C. | 1100° C. | 1200° C. | 1300° C. | 1400° C. |
| Weight reduction | 100% | 100% | 100% | 100% | 100% |

As is apparent from Table 1, the porous ceramic body according to the present invention may be completely removed even upon comparatively short period of process time of 1 hr-leaching. The use of a coarse powder having high particle flowability exhibits excellent leaching properties. The particle flowability is represented by an angle of repose. The particles having high flowability have a small angle of repose. As the particle size increases, the angle of repose decreases and the flowability increases. Thus the particles are easily flowed out during leaching. This is because the flow behavior of the coarse powder is affected by gravity rather than interparticle attractive force. Hence, the particle size has to be hundreds of μm or more. The feature that porous ceramic body may be easily removed is of good use in the applications for a core or a shell mold, or a separating filter in order to obtain a complex shaped product.

TEST EXAMPLE 2: Appearance

Figure 11:
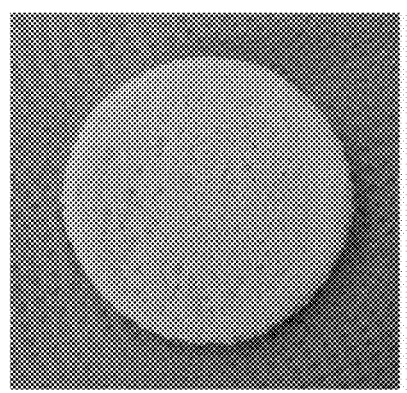
FIG. 11 illustrates a photograph of a bulk porous ceramic body of Example 3.
Figure 12:
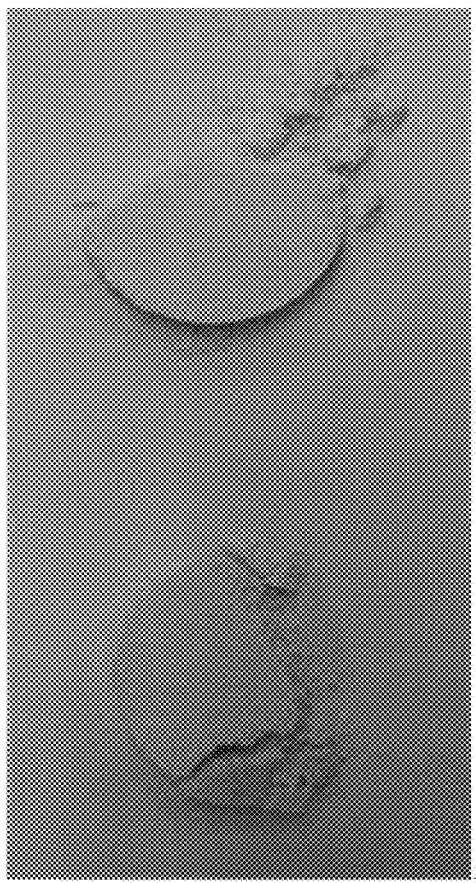
FIG. 12 illustrates a photograph of a porous ceramic body of Comparative Example 1.
Figure 13:
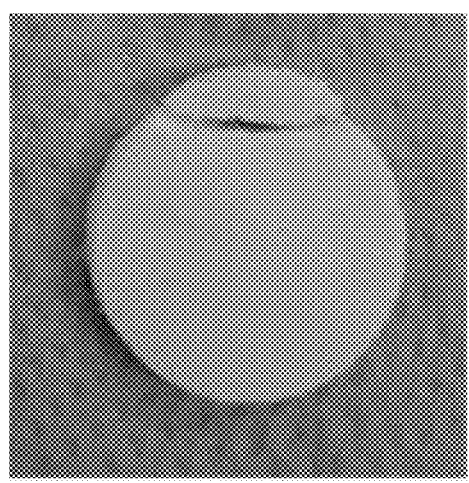
FIG. 13 illustrates a photograph of a porous ceramic body of Comparative Example 2.

The photographs of the porous ceramic bodies of Example 4 and Comparative Examples 1 and 2 are shown in FIGS. 11 to 13. As shown in FIG. 11, the porous ceramic body according to the present invention was manufactured in bulk form and ensured good dimensional stability and shape stability. On the other hand, as illustrated in FIGS. 12 and 13, the porous ceramic bodies of Comparative Examples 1 and 2 were not completely densified through high-temperature heat treatment, and thus were easily broken even by weak impact in the course of taking the sample out of the furnace. This means that the porous ceramic bodies of the comparative examples had low productivity with precise dimension and shape reliability.

What is claimed is:
1. A method of manufacturing a porous ceramic body, comprising:
 (S1) mixing fused silica powders having a particle size of 0.045~0.5 mm, zircon flour and wax, thus preparing a ceramic mixture;
 (S2) placing the ceramic mixture into a mold, thus producing a green body; and
 (S3) sintering the green body at a high temperature, thus obtaining a porous ceramic body,
 wherein the fused silica powders having a particle size of 0.1~0.5 mm are contained in an amount of 50~80 wt % based on a total mass of the porous ceramic body,
 wherein in S1, the wax is a mixture comprising two kinds of wax having different melting points mixed at a weight ratio of 6:4~9:1; and
 wherein in S1, the fused silica powders having a particle size of 0.045~0.5 mm comprises:
  fused silica powders having a particle size of 0.2~0.5 mm;
  fused silica powders having a particle size of 0.1~0.2 mm;
  fused silica powders having a particle size of 0.149 mm; and
  fused silica powders having a particle size of 0.045 mm.
2. The method of claim 1, wherein in S1, the zircon flour has a particle size of 0.045 mm.
3. The method of claim 1, wherein in S1, the wax is contained in an amount of 5~40 wt % based on a total mass of the ceramic mixture.
4. The method of claim 1, wherein in S1, the ceramic mixture comprises, based on a total mass thereof:
 1~15 wt % of fused silica powders having a particle size of 0.2~0.5 mm;
 1~40 wt % of fused silica powders having a particle size of 0.1~0.2 mm;
 5~40 wt % of fused silica powders having a particle size of 0.149 mm;
 5~50 wt % of fused silica powders having a particle size of 0.045 mm;
 10~50 wt % of zircon flour having a particle size of 0.045 mm; and
 5~40 wt % of wax.
5. The method of claim 1, wherein in S1, the ceramic mixture further comprises an additive selected from the group consisting of alumina, silicon carbide, polyvinylalcohol, cellulose, polyvinylbutyral, acrylate and ethyl silicate.
6. The method of claim 1, wherein in S1, the wax is selected from the group consisting of paraffin wax, microcrystalline wax, polyolefin wax, beeswax, carnauba wax and mixtures thereof.
7. The method of claim 6, wherein in S1, the wax is a mixture comprising paraffin wax having a melting point of 70° C. and microcrystalline wax having a melting point of 82° C. mixed at a weight ratio of 8:2.
8. The method of claim 1, wherein S1 further comprises maintaining the ceramic mixture at a temperature of 50~85° C., after preparing the ceramic mixture.

9. The method of claim 1, wherein in S3, the green body is sintered at a temperature of 1000~1400° C.

10. The method of claim 9, wherein a holding time of sintering the green body is 2~24 hr.

\* \* \* \* \*